(12) United States Patent
Thompson et al.

(10) Patent No.: US 9,968,153 B2
(45) Date of Patent: May 15, 2018

(54) HELMET SAFETY LIGHTING SYSTEM

(71) Applicant: Bell Sports, Inc., Scotts Valley, CA (US)

(72) Inventors: David M. Thompson, Ben Lomond, CA (US); Samuel Kass, San Jose, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 0 days. days.

(21) Appl. No.: 15/392,768

(22) Filed: Dec. 28, 2016

(65) Prior Publication Data

US 2018/0055131 A1 Mar. 1, 2018

Related U.S. Application Data

(60) Provisional application No. 62/378,645, filed on Aug. 23, 2016.

(51) Int. Cl.

| *F21V 21/084* | (2006.01) |
| *A42B 3/04* | (2006.01) |
| *F21V 8/00* | (2006.01) |
| *F21V 23/04* | (2006.01) |
| *F21L 4/08* | (2006.01) |
| *F21Y 113/20* | (2016.01) |
| *F21V 23/06* | (2006.01) |

(52) U.S. Cl.
CPC ............... *A42B 3/0446* (2013.01); *F21L 4/08* (2013.01); *F21V 23/0407* (2013.01); *F21V 23/0414* (2013.01); *F21V 23/0464* (2013.01); *F21V 23/06* (2013.01); *G02B 6/0035* (2013.01); *F21Y 2113/20* (2016.08)

(58) Field of Classification Search
CPC ..... A42B 3/044; A42B 3/0446; A42B 3/0453; F21V 33/0008; G02B 6/0035; G02B 6/0011; G02B 6/0066; G02B 6/0091
USPC ........................................ 362/105, 106, 606
See application file for complete search history.

(56) References Cited

U.S. PATENT DOCUMENTS

| 2,473,394 | A | | 6/1949 | Clarence |
| 4,559,586 | A | | 12/1985 | Slarve |
| 4,654,760 | A | | 3/1987 | Matheson et al. |
| 5,147,129 | A | * | 9/1992 | Ku .......... B42D 15/022 362/106 |
| 5,357,409 | A | * | 10/1994 | Glatt ........... A42B 3/044 362/105 |

(Continued)

FOREIGN PATENT DOCUMENTS

| JP | 1150322 | 2/1999 |
| TW | 200724046 | 7/2007 |

(Continued)

*Primary Examiner* — William N Harris
(74) *Attorney, Agent, or Firm* — Booth Udall Fuller, PLC

(57) ABSTRACT

An illuminable helmet assembly is disclosed. The helmet assembly may include a helmet body having an outer shell, an energy management layer and a fit system. A light diffuser is coupled to an outer surface of the helmet body, the diffuser having an illumination surface with an outer perimeter and defining a footprint of the illumination surface extending inward from the illumination surface to a center of the helmet body. A light source is positioned adjacent to and in some cases outside of the outer perimeter and the footprint of the illumination surface. The light source is positioned to emit light toward the illumination surface at an acute angle to the illumination surface.

20 Claims, 6 Drawing Sheets

(56) References Cited

U.S. PATENT DOCUMENTS

| | | | | |
|---|---|---|---|---|
| 5,508,900 A * | 4/1996 | Norman | A42B 3/0406 2/422 |
| 5,680,718 A * | 10/1997 | Ratcliffe | A42B 1/248 2/195.1 |
| 5,743,621 A | 4/1998 | Mantha et al. | |
| 5,871,271 A * | 2/1999 | Chien | A42B 3/044 362/103 |
| 6,340,234 B1 * | 1/2002 | Brown, Jr. | A61F 9/06 362/105 |
| 6,464,369 B1 * | 10/2002 | Vega | A42B 3/044 362/105 |
| 6,752,510 B1 * | 6/2004 | Appiah | A42B 3/044 362/103 |
| 7,121,676 B1 * | 10/2006 | Kutnyak | A42B 3/044 362/105 |
| 7,128,434 B1 | 10/2006 | Nally et al. | |
| 8,388,164 B2 * | 3/2013 | Waters | G02C 11/04 174/74 A |
| 8,550,651 B2 * | 10/2013 | Waters | A42B 1/244 2/209.13 |
| 2005/0099798 A1 * | 5/2005 | Cugini | F21L 14/00 362/105 |
| 2005/0265015 A1 | 12/2005 | Salazar | |
| 2006/0215393 A1 * | 9/2006 | VanderSchuit | G09F 21/02 362/106 |
| 2009/0086468 A1 * | 4/2009 | Carillo | A42B 3/044 362/106 |

FOREIGN PATENT DOCUMENTS

| | | |
|---|---|---|
| WO | 2005067751 | 7/2005 |
| WO | 2005096856 | 10/2005 |

\* cited by examiner

HELMET SAFETY LIGHTING SYSTEM

RELATED APPLICATIONS

This application is based on, claims priority to, and incorporates herein by reference in its entirety, U.S. Provisional Patent Application Ser. No. 62/378,645, filed on Aug. 23, 2016, and entitled "Helmet Safety Lighting System and Method for Same."

TECHNICAL FIELD

Aspects of this document relate generally to helmet safety lighting system, and more specifically to a helmet with a light enclosed in a back panel of the helmet with a diffuser.

BACKGROUND

Protective headgear and helmets have wide uses. Some helmets include bright or conspicuous elements designed to make the user more visible to nearby motorists or others. Many existing lighting elements for helmets are small because large lighting elements typically require large amounts of power and space for power sources within helmets and, as a result, reduce the space available for protective materials or undesirably enlarge the helmet.

It would be desirable to have a helmet safety lighting system having higher visibility illuminated by the lighting elements and, in mean time, requiring less power and space for the power sources.

SUMMARY

According to an aspect of the disclosure, an illuminable helmet assembly may comprise a helmet body comprising an outer shell, an energy management layer inside the outer shell and a fit system within the energy management layer and coupled to the helmet body, a diffuser coupled to an outer surface of the helmet body, the diffuser comprising an illumination surface, the illumination surface comprising an outer perimeter and defining a footprint of the illumination surface extending inward from the illumination surface to a center of the helmet body, and a light source positioned adjacent to and outside of the outer perimeter and the footprint of the illumination surface, and positioned to emit light toward the illumination surface at an acute angle to the illumination surface.

Particular embodiments of the disclosure may comprise one or more of the following features. At least one cavity may be recessed into an outer surface of the helmet body, wherein the light source is placed in the at least one cavity. The diffuser may be positioned to cover the at least one cavity. Retroreflective surfaces may be positioned on at least one of the at least one cavity and the diffuser, wherein the retroreflective surfaces are configured to display at least one of a light pattern and a uniform distribution of the light on the illumination surface. A top shell may be coupled to the helmet body and cover a majority of the illumination surface, wherein a portion of the top shell covering the illumination surface is translucent. The light source may be positioned at an angle with respect to the illumination surface of from 0 to 20 degrees. The diffuser may be a wave guide comprising a front surface, a rear surface, and an edge surface extending between the front surface and the rear surface, wherein the light source is positioned to emit at least a portion of the light into the edge surface of the diffuser. The illuminated areas of the diffuser may be constructed of a translucent material. The light source may comprise at least one of a light-emitting diode and an incandescent light. A light sensor may be electrically coupled to the light source, wherein the light source is turned on when the light sensor detects ambient light of the helmet body falls below a first predetermined level, and is turned off when the light sensor detects the ambient light exceeds a second predetermined level. The light source may be configured to emit the light in at least one of modes and patterns selected by a user.

According to an aspect of the disclosure, an illuminable helmet assembly, comprises a helmet body, a diffuser coupled to an outer surface of the helmet body, the diffuser comprising an illumination surface, the illumination surface comprising an outer perimeter and defining a footprint of the illumination surface extending inward from the illumination surface to a center of the helmet body, and a light source positioned adjacent to and outside of the outer perimeter and the footprint of the illumination surface, and positioned to emit light toward the illumination surface at an acute angle to the illumination surface.

Particular embodiments of the disclosure may comprise one or more of the following features. At least one cavity may be recessed into an outer surface of the helmet body, wherein the light source is placed in the at least one cavity. A top shell may be coupled to the helmet body and covering a majority of the illumination surface, wherein a portion of the top shell covering the illumination surface is translucent. The light source may be positioned to emit the light at an angle with respect to the illumination surface of from 0 to 20 degrees. The diffuser may be a wave guide comprising a front surface, a rear surface, and an edge surface extending between the front surface and the rear surface, wherein the light source is positioned to emit at least a portion of the light into the edge surface of the diffuser. The light source may comprise at least one of a light-emitting diode and an incandescent light. A light sensor may be electrically coupled to the light source, wherein the light source is turned on when the light sensor detects ambient light of the helmet body falls below a first predetermined level, and is turned off when the light sensor detects the ambient light exceeds a second predetermined level. Retroreflective surfaces may be positioned on at least one of the at least one cavity and the diffuser, wherein the retroreflective surfaces are configured to display at least one of a light pattern and a uniform distribution of the light on the illumination surface. The light source may be configured to emit the light in at least one of modes and patterns selected by a user.

Aspects, embodiments and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. §112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DETAILED DESCRIPTION

Protective headgear and helmets have been used in a wide variety of applications and across a number of industries, including recreation, sports, athletics, construction, mining, and military defense, to prevent damage to users' heads and brains. Damage and injury to a user can be prevented or reduced by preventing hard objects, sharp objects, or both, from directly contacting the user's head, and also from absorbing, distributing, or otherwise managing energy of an impact between the object and the user's head. Straps or webbing are typically used to allow a user to releasably wear their helmet, and to ensure the helmet remains on the user's head during an impact.

Helmets function to provide protection while minimizing interference with an activity. The shape of a helmet may be adapted to provide both protection and comfort (e.g. ventilation and size). Some helmets are made of two or more bodies of energy-absorbing material to form shapes that would be difficult, if not impossible, to achieve in a single molded piece.

Various implementations and embodiments of protective helmets according to this disclosure comprise a protective shell. The protective shell can be made of an energy absorbing material, such as expanded polystyrene (EPS), expanded polyurethane (EPU), expanded polyolefin (EPO), expanded polypropylene (EPP), or other suitable material. The energy absorbing material can be part of a hard-shell helmet such as skate bucket helmets, motorcycle helmets, snow sport helmets, football helmets, batting helmets, catcher's helmets, or hockey helmets, and include an additional outer protective shell disposed outside, or over, the protective shell. In hard shell applications, the energy absorbing material can comprise one or more layers of EPP and provide more flexibility than available with conventional in-molded helmets. Alternatively, the energy absorbing material can be part of an in-molded helmet such as bicycle helmet or cycling helmet. As an energy-absorbing layer in an in-molded helmet, the protective shell can comprise rigid materials such as EPS and EPU. An outer shell layer, such as a layer of stamped polyethylene terephthalate (PET) or a polycarbonate shell, can be included on an outer surface of the protective shell of the helmet and be bonded directly to the expanding foam (e.g. EPS as it is expanding such that the foam is molded in the shell).

Contemplated as part of this disclosure is a protective helmet having a light source positioned to illuminate a diffuser. Specifically, a diffuser is positioned immediately adjacent to or near a light source so that the light emitted by the light source strikes the diffuser and thereby illuminates at least a portion of the diffuser.

Figure 1A:
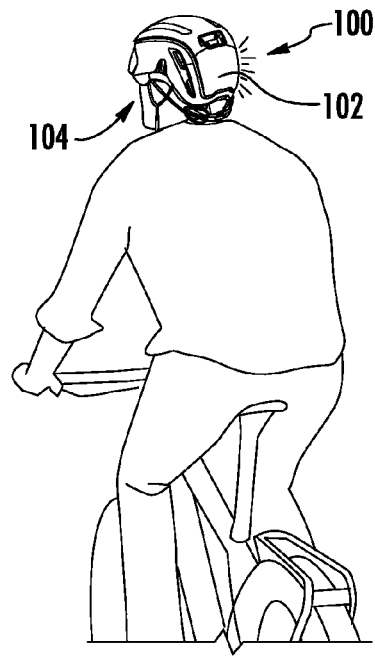
FIG. 1A is a rear view of an illuminable helmet assembly worn by a biker.
Figure 1B:
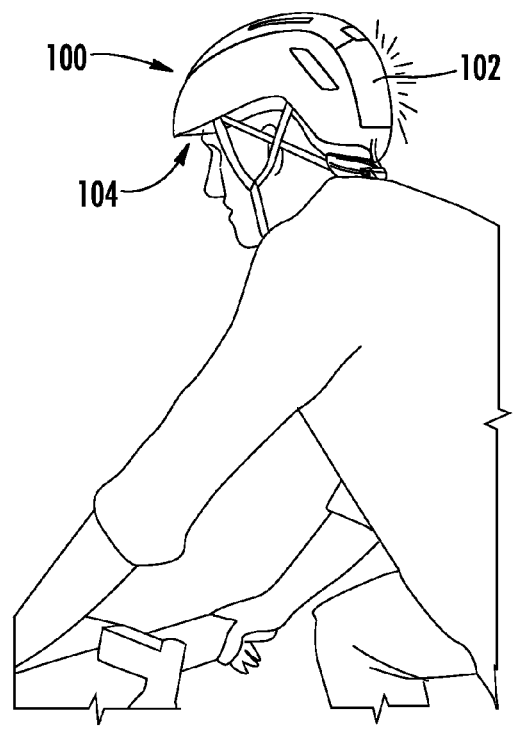
FIG. 1B is a left rear perspective view of an illuminable helmet assembly worn by a biker.

FIGS. 1A and 1B depict a non-limiting example of an illuminable helmet assembly 100 that includes a diffuser 102 (shown illuminated in red/orange). The diffuser 102 is illuminated by a light source (positioned near the top of the diffuser 102) and coupled to the helmet body 104 that includes an energy absorbing material. As shown, the illuminable diffuser may be positioned at the back of the user's head and have a large rectilinear shape. The diffuser is "illuminable" because a user may choose to conserve battery power of the light module by only illuminating the diffuser in dark or other conditions. In particular embodiments, the diffuser may be positioned at more or alternative locations on the helmet and the diffuser may have alternative shapes or designs.

Figure 2:
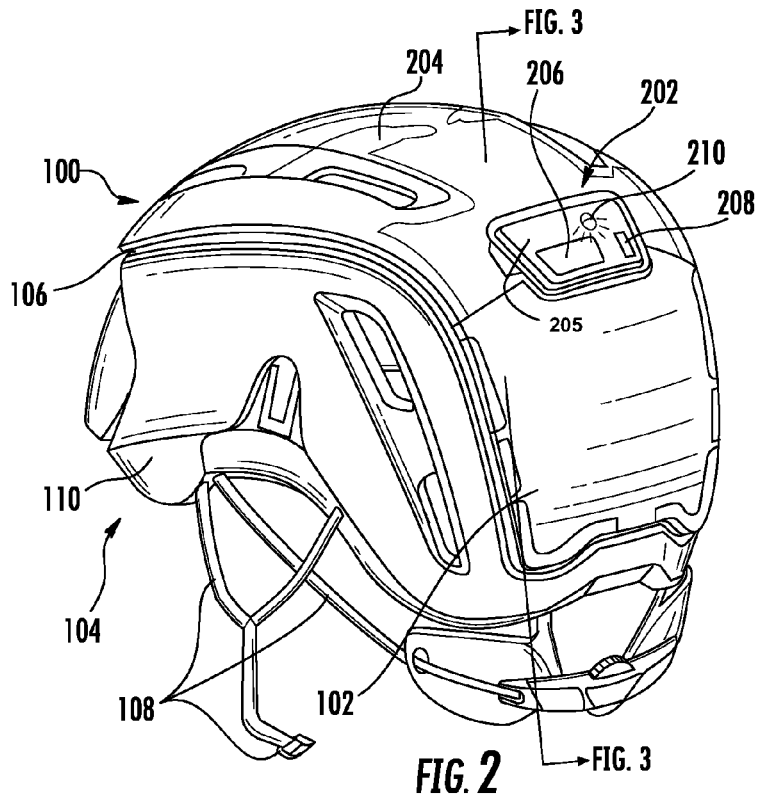
FIG. 2 is a left rear perspective view of an illuminable helmet assembly.
Figure 3:
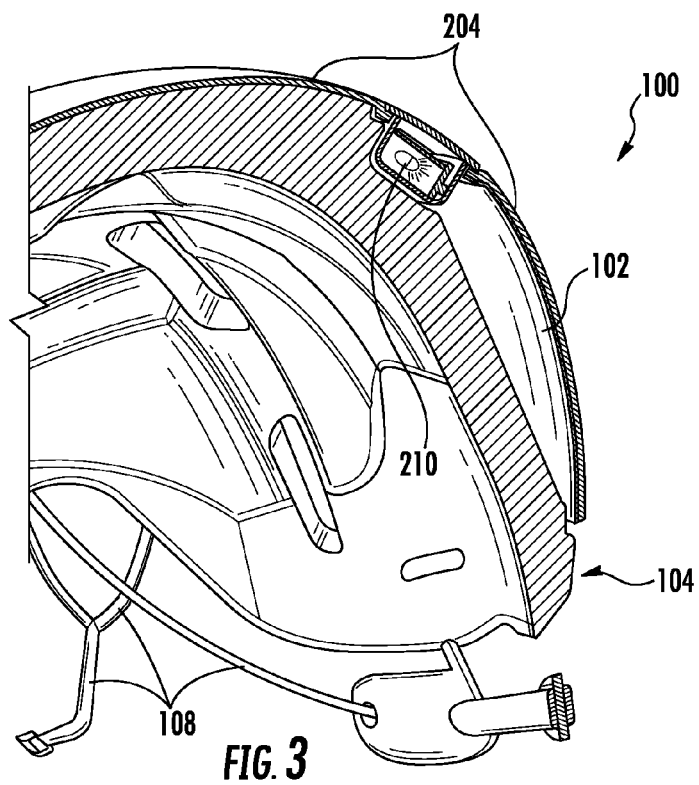
FIG. 3 is a partial cross-sectional view of an illuminable helmet assembly.

FIG. 2 depicts a non-limiting example of an illuminable helmet assembly 100 in a rear perspective view, and FIG. 3 depicts a non-limiting example of an illuminable helmet assembly 100 in a partial cross-sectional view. An illuminable helmet assembly 100 may comprise a helmet body 104, a diffuser 102, and a light source 210. The light source 210 may be housed in a light module 202. The helmet body 104 may comprise an outer shell 106, an energy management layer 110 inside the outer shell 106, and a fit system 108 used to adjust the fitting of the helmet on the wearer's head. Fit systems are well known in the art and any fit system known in the art is acceptable for use with the presently disclosed embodiments. The light source may be a light-emitting diode (LED), an incandescent light, or other light source capable of low power operation. The light module 202 may further comprise an on/off button 206 and a power port 208 (e.g., a universal serial bus (USB) power port). The light module 202 is positioned adjacent to the diffuser 102. The assembly 100 may further comprise a top shell 204, including at least a translucent portion configured to cover the majority of the diffuser 102. In some embodiments, the outer shell and the top shell may be one piece that serves as the outer shell of the helmet body and, in the meantime, as a top shell covering the majority of the diffuser.

Figure 4:
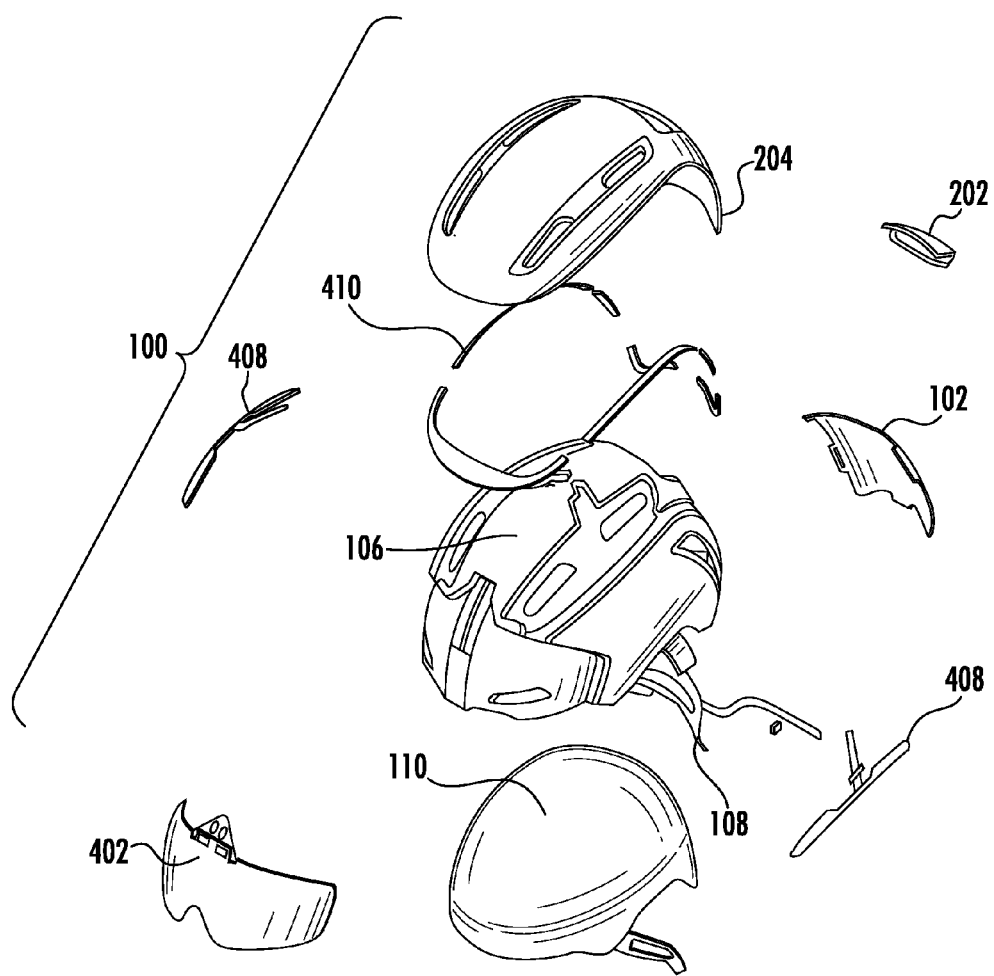
FIG. 4 is an exploded view of an illuminable helmet assembly.

FIG. 4 depicts a non-limiting example of an exploded view of an illuminable helmet assembly 100. A diffuser 102 couples to a helmet body and is positioned adjacent to a light source. The light source is part of the light module 202, which also has a battery or other power source to power the light source. A top shell 204 may couple to the helmet and cover the majority of the diffuser (e.g., using adhesives 410 or other couplers or fasteners). The illuminable helmet assembly may also include various other helmet elements and features depending on the intended use of the illuminable helmet assembly. For example, the illuminable helmet assembly may include a helmet body that comprises an outer shell 106, an energy management system 110 such as a liner or a multi-directional impact protection system (MIPS), and a fit system 108. The helmet body may further comprise sliders 408 or a retractable shield 402. Additional elements and features common to helmets may be added to the illuminable helmet assembly.

Figure 5:
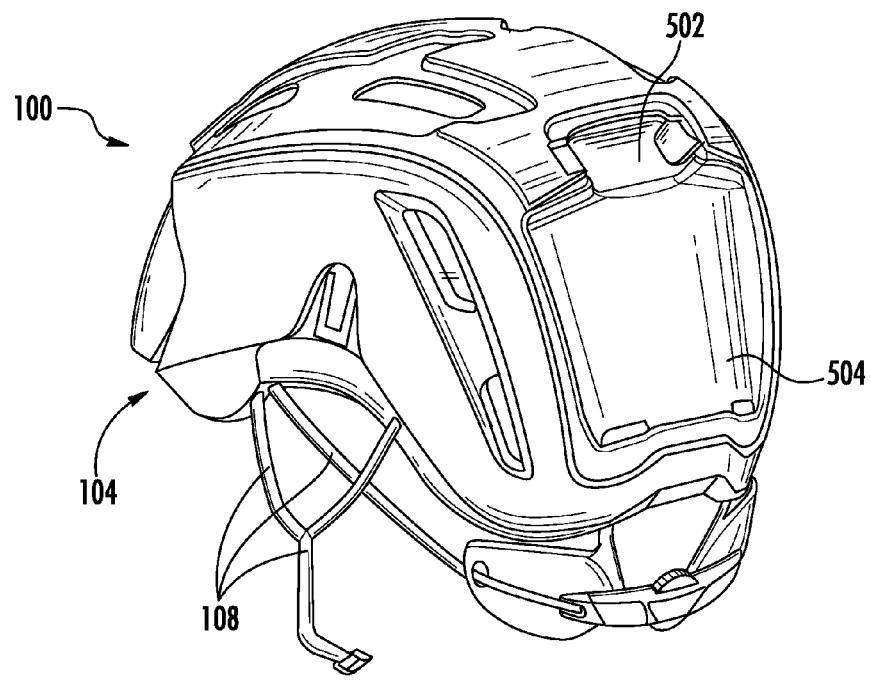
FIG. 5 is a rear perspective view of an illuminable helmet assembly showing cavities in the helmet body.

FIG. 5 depicts a non-limiting example of an illuminable helmet assembly 100 in a rear perspective view, according to various embodiments. The helmet and/or the energy absorbing material may include one or more cavities 502 and 504 or voids shaped to house the light module or the diffuser. In certain embodiments, the diffuser covers the diffuser cavity. In various embodiments, a diffuser cavity 504 (also shown in FIG. 7) has sufficient depth to allow light emitting from the light source to hit at least the majority of the diffuser. The diffuser cavity may have a depth and shape configured to not obstruct the path of light from the light source to the diffuser. The light module cavity 502 may have a depth sufficient to house the light module 202.

Figure 6:
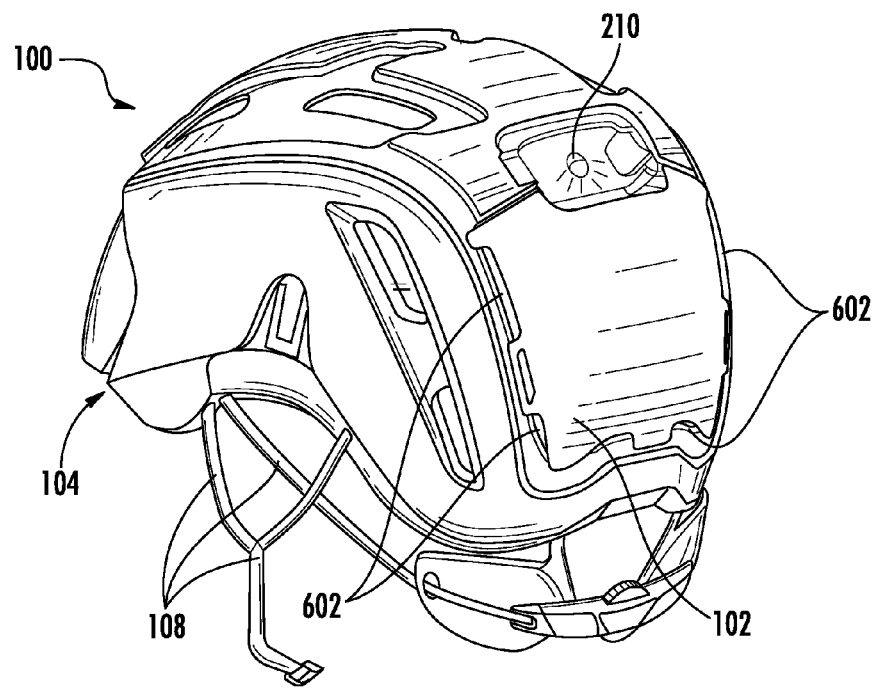
FIG. 6 is a rear perspective view of an illuminable helmet assembly with a diffuser being placed in a diffuser cavity.

FIG. 6 depicts a non-limiting example of an illuminable helmet assembly 100 in a rear perspective view, according to various embodiments. The diffuser 102 may couple to the helmet body with clips, couplers, adhesives, snap fit in place, or other fasteners. In the non-limiting example as shown in FIG. 6, the diffuser is coupled to the helmet body with brackets 602. The diffuser may be shaped in any variety of rectilinear, curvilinear, or irregular shapes. The illuminated areas of the diffuser may be constructed of a translucent material (e.g., polymers, thermoplastics, and thermosets). The illuminated areas of the diffuser may be white, milky-white, somewhat opaque, or may be a colored or tinted (but translucent) plastic or other material. Some embodiments may use two or more diffusers, which may be illuminated by a single light source or by multiple light sources (not shown).

Figure 7:
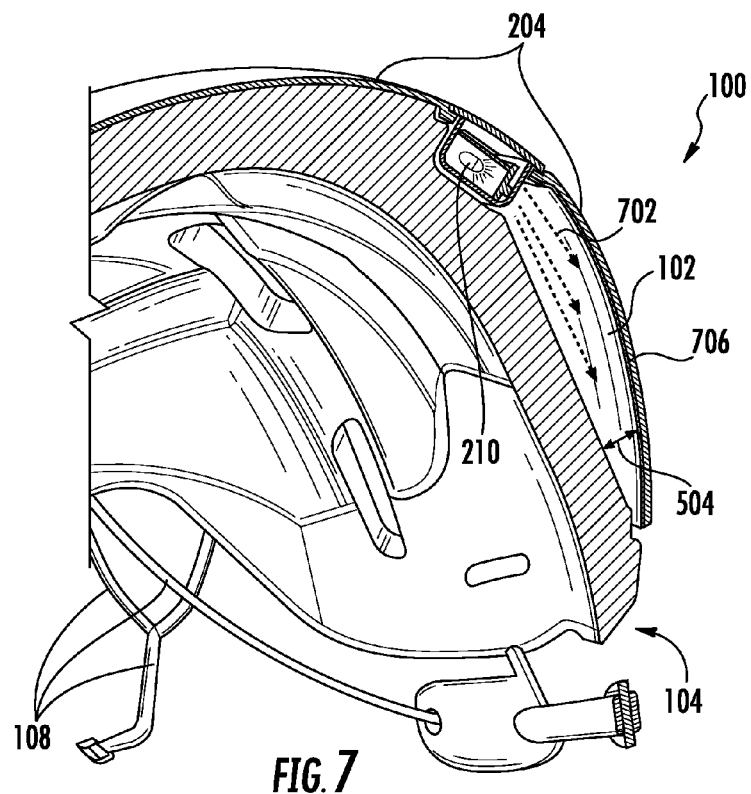
FIG. 7 is a partial cross-sectional view of an illuminable helmet assembly showing light emitted from a light source.

FIG. 7 depicts a non-limiting example of an illuminable helmet assembly 100 in a partial cross-sectional view. The diffuser 102 has an illumination surface. The illumination surface may be the rear surface 706 of the diffuser 102. The illumination surface comprises an outer perimeter and defines a footprint of the illumination surface extending inward from the illumination surface to the center of the helmet body. The light source 210 is positioned adjacent to the diffuser and configured to emit light 702 towards and illuminate the diffuser 102. In some embodiments, the light source is positioned to primarily direct light in a near-parallel orientation (e.g., within 3-25° off of parallel) with respect to the illumination surface of the diffuser. As shown, a light 702 emitted in a near-parallel orientation to the diffuser 102 permits the light of the light source 210 to spread out over a large area of the diffuser and produce a large and glowing light. In some embodiments, the light source is positioned at an angle of acute angles, 3-60°, 3-45°, 3-30°, or 3-20° with respect to the illumination surface of the diffuser 102.

If one or more LEDs are used as the light source, the angle used herein is the angle between the direction of the LEDs' light having the maximum luminous intensity and the illumination surface of the diffuser. The angle between a line and a surface is the angle between the line and the projection of the line onto the tangent of the surface at the intersection point of the line with the surface; if the line and the surface are extended to infinity and still do not intersect, the angle between them is 0°. If one or more incandescent lights are used as the light source, one or more reflective or retroreflective structures may be used to direct the light emitted by the light source, and the angle is the angle of intersection of the line drawn from the light source in the direction of its maximum illumination and the illumination surface of the diffuser. If one or more incandescent lights are used as the light source but the light emitted from the light source is not directed (meaning it does not have a peak intensity direction or maximum illumination direction), the light source may be placed adjacent to and the outside of the outer perimeter and the footprint of the illumination surface, and the light emitted from the light source may form an angle of acute angles, 3-60°, 3-45°, 3-30°, or 3-20° with the illumination surface. When the light source is placed outside of the outer perimeter and the footprint of the illumination surface, a non-uniform bright spot may be avoided on the illumination surface and, as a result, the helmet and the rider are more visible to others.

Figure 8:
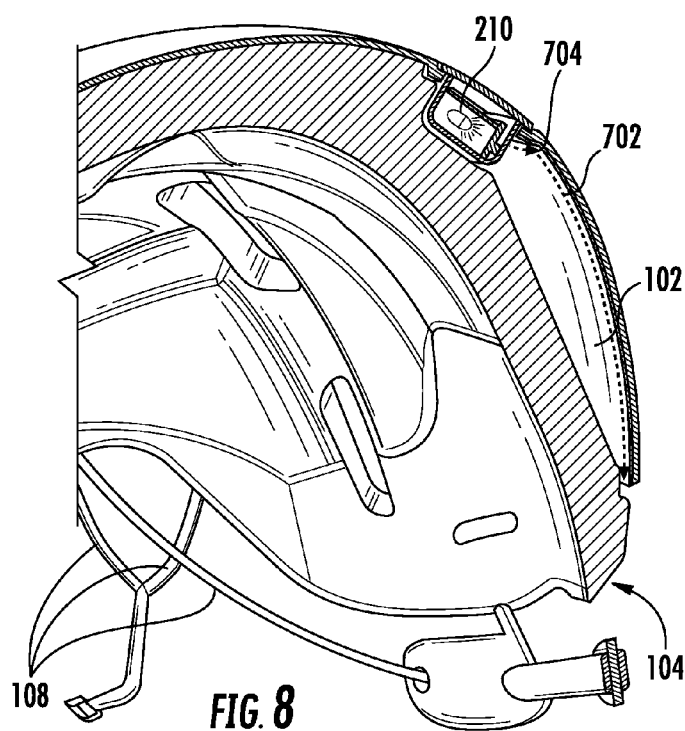
FIG. 8 is a partial cross-sectional view of an illuminable helmet assembly.

FIG. 8 depicts a non-limiting example of an illuminable helmet assembly in a partial cross-sectional view. In this non-limiting example embodiment, light 702 emitted by a light source 210 is directed into an edge surface 704 (extending between the front and rear surfaces of the diffuser) or an entry of the diffuser where the diffuser operates as a wave guide (e.g., fiber optic and edge-lit plastics). The diffuser 102 is illuminated by guiding the light 702. In some embodiments, the diffuser includes both surface lighting and wave guide lighting to illuminate the diffuser.

In certain embodiments, the diffuser cavity and/or the diffuser include retroreflective surfaces, prisms, or other light scattering structures positioned to help scatter the light uniformly or in patterns on the diffuser. In certain embodiments, the diffuser may comprise a white surface and diffusely reflect light shined on the white surface.

Figure 9:
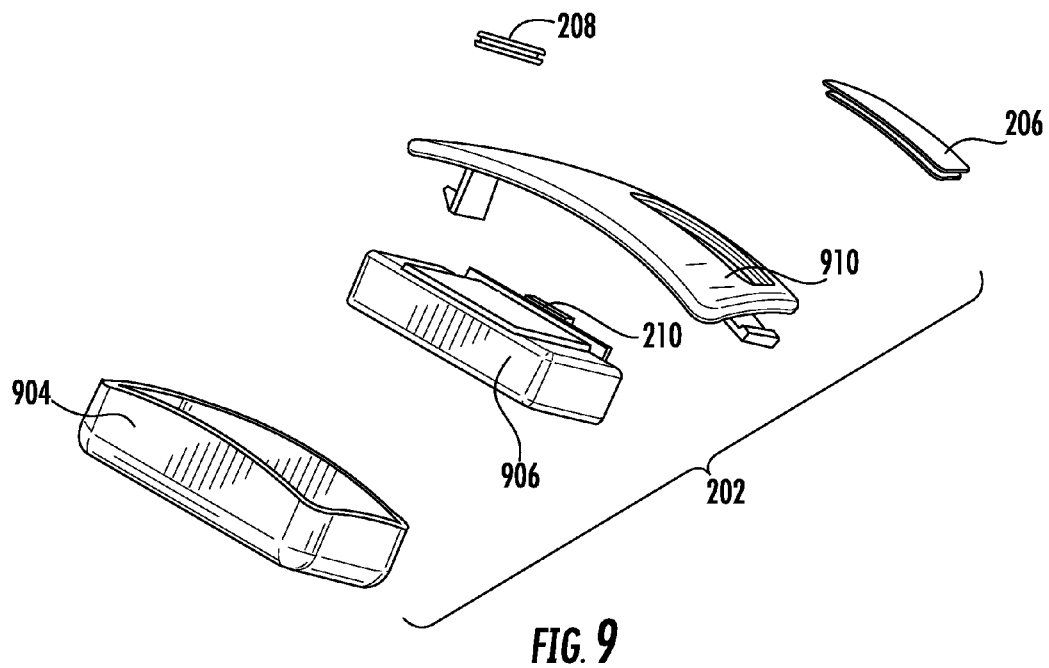
FIG. 9 is an exploded view of a light module configured for use in an illuminable helmet assembly.

FIG. 9 depicts a non-limiting example of an exploded view of a light module 202 configured for use in an illuminable helmet assembly. A light module 202 includes a light source positioned adjacent to the diffuser and may include an on/off button 206 to operate the light source 210 and a power port 208 (e.g., a USB or similar port) to allow recharging of a battery housed in the light module. A light module 202 may further comprise a housing 904 and a cover 910. As shown, the light module 202 includes at least a light source 210 that is directed in a position sufficient to illuminate the diffuser. The light module may include a power source 906, such as one or more primary batteries, one or more secondary batteries, a solar array, an AC power outlet or supply, or power generated by the user's movement. The power source may be housed within the light module (as shown) or the power source may be located away from the light module and electrically couple with the light source (e.g., an external battery pack, a solar array, or power generated by a cyclist pedaling). The light module may include an on/off button 206 or switch that allows the user to manually illuminate the light source 210 (and thereby the diffuser). The light module may include one or more buttons or switches allowing a user to select between various operation modes or blinking patterns (e.g., solid non-blinking, different blinking rates, different blinking patterns, pulsing, glowing, low to high intensities of light, distress signals, and different colors of light sources).

In some embodiments, the light module includes a power port where a secondary battery is recharged. The power port may be a USB port or other similar ports that allow a user to plug into the power port a cable from an AC to DC power adapter (or other power supply). A charge controller or other recharge management circuitry or firmware may be coupled to the power port and secondary battery (and may also be housed in the light module). The power port may include a rubberized protective cover, flap, or seal that helps keep dirt and moisture from entering the power port. The power port may be concealed from view by a cover.

In particular embodiments, the light source may be responsive to a light sensor 205, with a setting associated with the on/off button, to automatically power the light source on to illuminate the diffuser when the ambient light around the helmet falls below a certain low level so that the user does not need to remember to turn it on at night or in the dark. The light sensor 205 may also power off the light source if the ambient light around the helmet exceeds a certain level so that the user does not need to remember to turn it off when arriving at a bright area.

Figure 10:
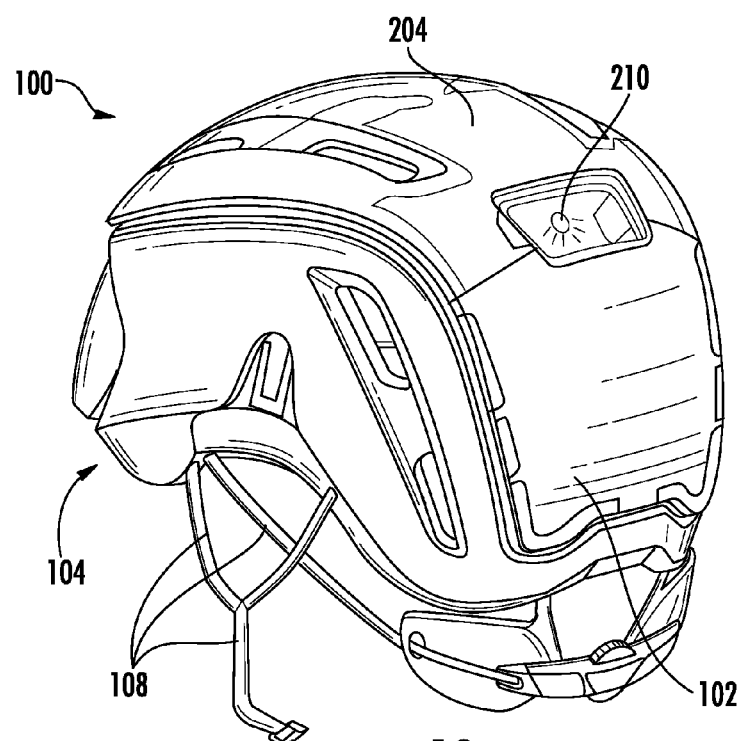
FIG. 10 is a rear perspective view of an illuminable helmet assembly showing a top shell.

FIG. 10 depicts a non-limiting example of an illuminable helmet assembly 100 in a rear perspective view, according to various embodiments. As shown, some embodiments use a top shell 204 that covers the majority of the diffuser 102, but allows light from the diffuser 102 to emit outwards because at least a portion of the top shell 204 covering the diffuser is translucent. The thickness of the top shell over the diffuser may be approximately 0.3-6 mm, 0.5-3 mm, or 0.5-2 mm. In some embodiments, the diffuser may be exposed without a top shell covering the diffuser.

In some embodiments, the diffuser 102 is covered by the top shell 204 so that when the light source is not illuminated, the top shell appears to be in a uniform color (e.g., black or grey). When the light source is turned on, however, the area of the top shell over the diffuser changes color to the color of the illuminated diffuser (e.g., the red/orange diffuser of FIGS. 1A-1B). A diffuser may be illuminated in a variety of different colors using colored lights of the light source, a tinted or colored diffuser, and/or tinted or colored reflective elements within the diffuser cavity.

This disclosure discloses protective headgear, as well as a system and method for providing a helmet or protective headgear that, although it's primary use may be for cyclists, may be used for a football player, hockey player, baseball player, lacrosse player, polo player, climber, auto racer, motorcycle rider, motocross racer, skier, snowboarder or other snow or water athlete, sky diver or any other athlete, recreational or professional, in a sport. In some embodiments, the illuminable helmet assembly is a helmet configured for use in a sport or activity in which users engage near motorized vehicles, such as cycling, roller-skating, or skateboarding. In some embodiments, the illuminable helmet assembly is a helmet configured for use in a sport or activity in which users may engage at night or in the dark, such as caving or spelunking, rescue work, cycling, construction work, or mountaineering.

Other non-athlete users such as workers involved in industry, including without limitation construction workers or other workers or persons in dangerous work environments can also benefit from the protective headgear described herein, as well as the system and method for providing the protective headgear. In some embodiments, the illuminable helmet assembly is a helmet configured for use in a work environment where users are near motorized vehicles, such as construction work, road building, or warehouse or dock work.

The present disclosure is to be considered as an exemplification of the principles of the disclosed methods and systems. The presently-disclosed implementations are, therefore, to be considered in all respects as illustrative, and not intended to limit the broad aspect of the disclosed concepts to the embodiments illustrated.

Many additional components and manufacturing and assembly procedures known in the art or consistent with helmet manufacture are contemplated for use with particular implementations in this disclosure. For example, although particular implementations are disclosed, such implementations and implementing components may comprise any components, models, types, materials, versions, quantities, and/or the like as is known in the art for such systems and implementing components, consistent with the intended operation.

In places where the description above refers to particular implementations of protective helmets, it should be readily apparent that a number of modifications may be made without departing from the spirit thereof. All changes that come within the meaning of and range of equivalency of the description are intended to be embraced therein.

The word "exemplary," "example" or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

The invention claimed is:

1. An illuminable helmet assembly, comprising:
   a helmet body comprising an outer shell, an energy management layer inside the outer shell and a fit system within the energy management layer and coupled to the helmet body;
   a diffuser coupled to an outer surface of the helmet body, the diffuser comprising a front surface facing outward, away from the helmet body, and a rear surface opposite the front surface, the diffuser further comprising an illumination surface on the rear surface of the diffuser, the illumination surface enclosing and facing an enclosed cavity of the helmet body, the illumination surface comprising an outer perimeter and defining a footprint of the illumination surface extending inward from the illumination surface to a center of the helmet body; and
   a light source positioned adjacent to and outside of the outer perimeter and the footprint of the illumination surface, and positioned to emit light toward the illumination surface on the rear surface of the diffuser at an acute angle to the illumination surface.

2. The illuminable helmet assembly of claim 1, further comprising at least one cavity recessed into an outer surface of the helmet body, wherein the light source is placed in the at least one cavity.

3. The illuminable helmet assembly of claim 2, wherein the diffuser is positioned to cover the at least one cavity.

4. The illuminable helmet assembly of claim 3, further comprising retroreflective surfaces positioned on at least one of the at least one cavity and the diffuser, wherein the retroreflective surfaces are configured to display at least one of a light pattern and a uniform distribution of the light on the illumination surface.

5. The illuminable helmet assembly of claim 1, further comprising a top shell coupled to the helmet body and covering a majority of the illumination surface, wherein a portion of the top shell covering the illumination surface is translucent.

6. The illuminable helmet assembly of claim 1, wherein the light source is positioned at an angle with respect to the illumination surface of from 3 to 20 degrees.

7. The illuminable helmet assembly of claim 1, wherein the diffuser is a wave guide comprising the front surface, the rear surface, and an edge surface extending between the front surface and the rear surface, wherein the light source is positioned to emit at least a portion of the light into the edge surface of the diffuser.

8. The illuminable helmet assembly of claim 1, wherein illuminated areas of the diffuser are constructed of a translucent material.

9. The illuminable helmet assembly of claim 1, wherein the light source comprises at least one of a light-emitting diode and an incandescent light.

10. The illuminable helmet assembly of claim 1, further comprising a light sensor electrically coupled to the light source, wherein the light source is turned on when the light sensor detects ambient light of the helmet body falls below a first predetermined level, and is turned off when the light sensor detects the ambient light exceeds a second predetermined level.

11. The illuminable helmet assembly of claim 1, wherein the light source is configured to emit the light in at least one of modes and patterns selected by a user.

12. An illuminable helmet assembly, comprising:
   a helmet body;
   a diffuser coupled to an outer surface of the helmet body, the diffuser comprising a front surface facing away from the helmet body and a rear surface opposite the front surface, the diffuser further comprising an illumination surface on the rear surface of the diffuser, the illumination surface facing an enclosed cavity of the helmet body, the illumination surface comprising an outer perimeter and defining a footprint of the illumination surface extending inward from the illumination surface to a center of the helmet body; and
   a light source positioned adjacent to and outside of the outer perimeter and the footprint of the illumination surface, and positioned to emit light toward the illumination surface on the rear surface of the diffuser at an acute angle to the illumination surface.

13. The illuminable helmet assembly of claim 12, further comprising at least one cavity recessed into an outer surface of the helmet body, wherein the light source is placed in the at least one cavity.

14. The illuminable helmet assembly of claim 12, further comprising a top shell coupled to the helmet body and covering a majority of the illumination surface, wherein a portion of the top shell covering the illumination surface is translucent.

15. The illuminable helmet assembly of claim 12, wherein the light source is positioned to emit the light at an angle with respect to the illumination surface of from 3 to 20 degrees.

16. The illuminable helmet assembly of claim 12, wherein the diffuser is a wave guide comprising the front surface, the rear surface, and an edge surface extending between the front surface and the rear surface, wherein the light source is positioned to emit at least a portion of the light into the edge surface of the diffuser.

17. The illuminable helmet assembly of claim 12, wherein the light source comprises at least one of a light-emitting diode and an incandescent light.

18. The illuminable helmet assembly of claim 12, further comprising a light sensor electrically coupled to the light source, wherein the light source is turned on when the light sensor detects ambient light of the helmet body falls below a first predetermined level, and is turned off when the light sensor detects the ambient light exceeds a second predetermined level.

19. The illuminable helmet assembly of claim 13, further comprising retroreflective surfaces positioned on at least one of the at least one cavity and the diffuser, wherein the retroreflective surfaces are configured to display at least one of a light pattern and a uniform distribution of the light on the illumination surface.

20. The illuminable helmet assembly of claim 12, wherein the light source is configured to emit the light in at least one of modes and patterns selected by a user.

* * * * *